Jan. 10, 1933.  W. M. CROSS  1,893,731
OIL HEATING FURNACE
Filed April 19, 1926  4 Sheets-Sheet 1
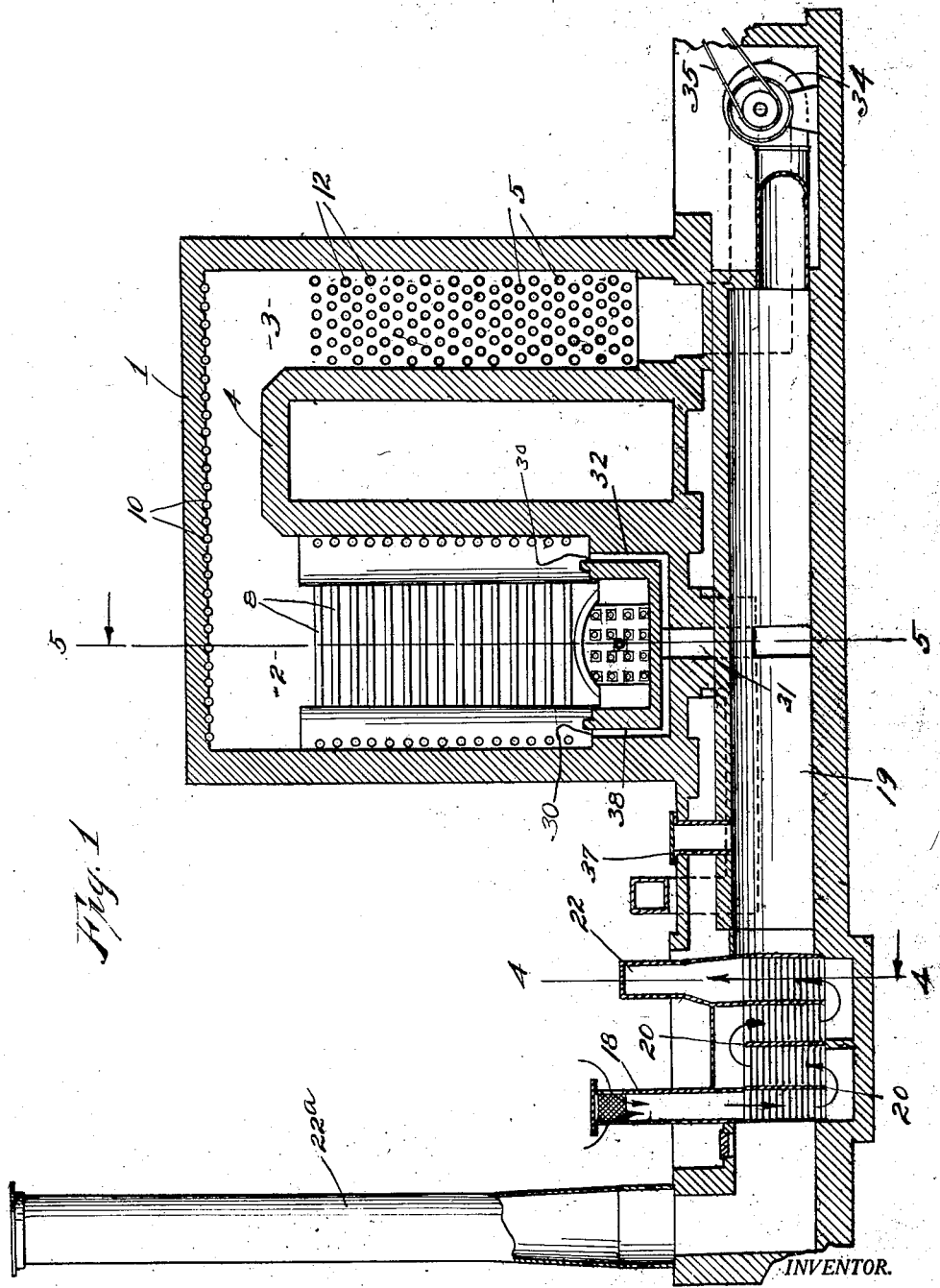

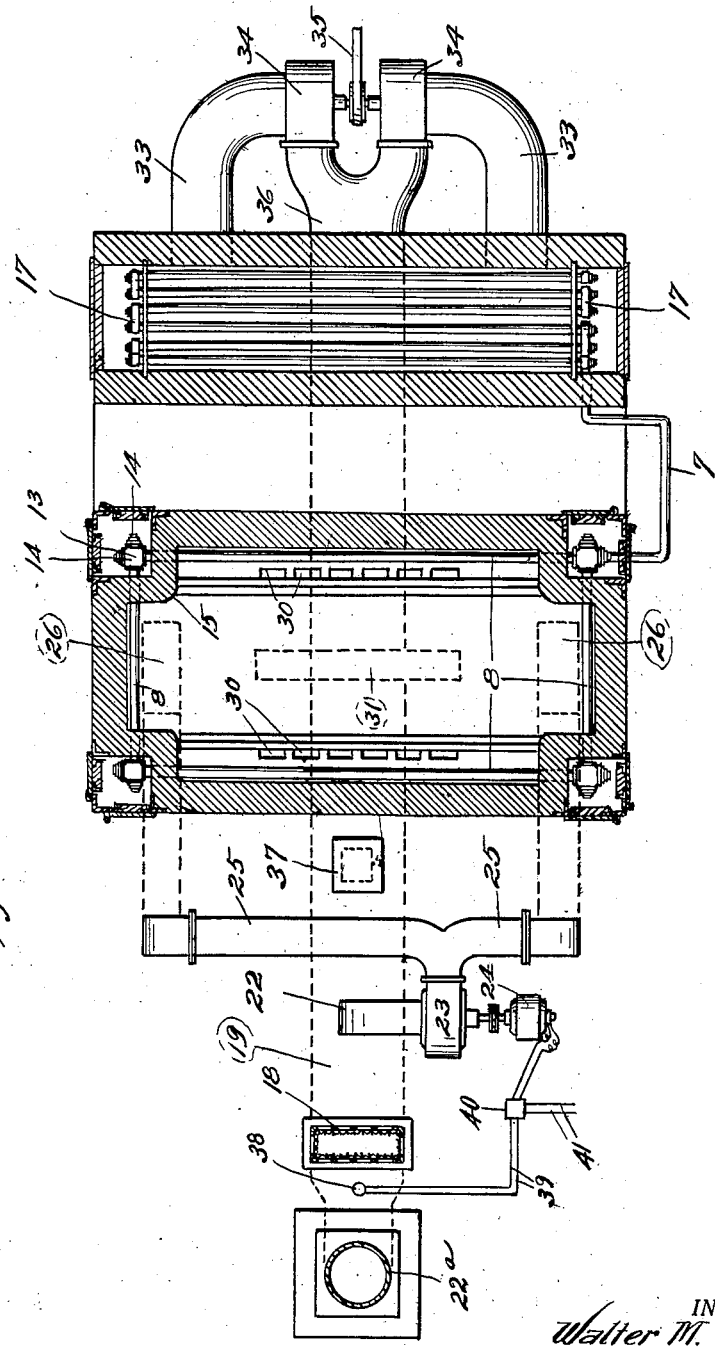

Jan. 10, 1933.   W. M. CROSS   1,893,731
OIL HEATING FURNACE
Filed April 19, 1926    4 Sheets-Sheet 3
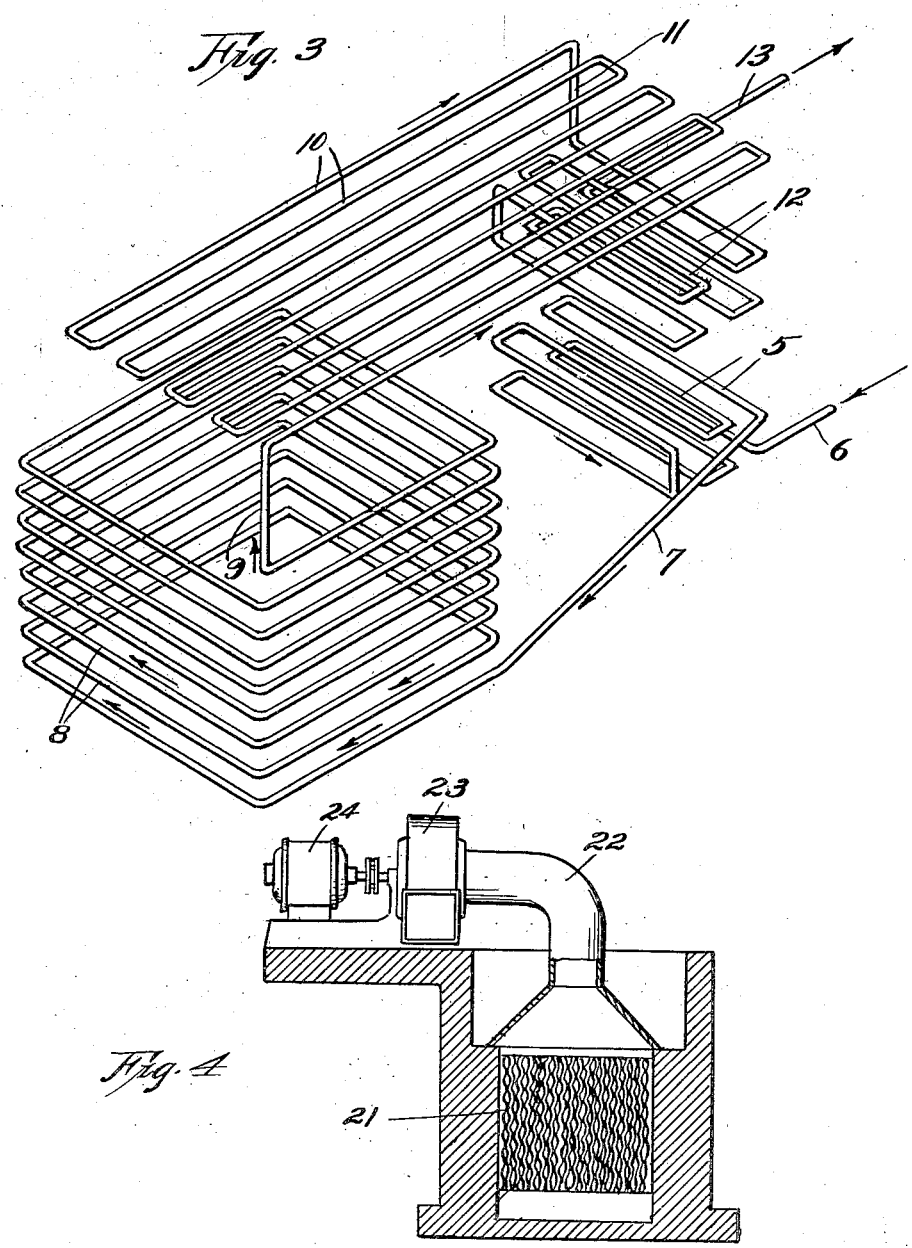

Jan. 10, 1933.  W. M. CROSS  1,893,731
OIL HEATING FURNACE
Filed April 19, 1926  4 Sheets-Sheet 4

Witness:
R. E. Hamilton

Inventor,
Walter M. Cross
By Thomas E. Scofield
Attorney

Patented Jan. 10, 1933

1,893,731

UNITED STATES PATENT OFFICE

WALTER M. CROSS, OF KANSAS CITY, MISSOURI, ASSIGNOR TO GASOLINE PRODUCTS COMPANY, INC., OF JERSEY CITY, NEW JERSEY, A CORPORATION OF DELAWARE

OIL HEATING FURNACE

Application filed April 19, 1926. Serial No. 103,181.

This application is a continuation in part of my copending application Serial No. 9,439, filed February 16, 1925, patented November 5, 1929, Patent No. 1,734,079.

This invention relates to improvements in oil heating furnace and refers more particularly to a furnace construction in which is positioned a plurality of connected tubes arranged to produce a continuous flow of the fluid medium through the furnace, the furnace consisting of a fire chamber and a tube chamber with the tubes arranged along the side walls and roof of the fire chamber and in banks or sets in the tube chamber.

Among the salient objects of the invention are to provide a construction in which the fluid medium circulated through the tubes will be more efficiently heated than in the usual types of furnaces where banks of tubes are positioned centrally of a chamber through which the gases of combustion are passed, to provide a construction in which the tubes through which the medium to be heated is passed are subjected to the direct radiant heating of the flame and a construction in which the intense convection heat produced centrally in the furnace by the impacting of the flames from the two ends of the furnace is tempered by screens of cooler gases recycled from the flue or returned from the tube chamber; to provide a construction in which the corner fittings of the pipes in the fire chamber are insulated from the intense heat of the chamber and also insulated from the cooling effect of the atmosphere by doors adapted to facilitate cleaning of the tubes; to provide a construction in which the incoming air to be supplied to the burners is preheated by the flue gases and in general to provide a construction hereinafter described in more detail.

Fig. 1 is a sectional side view of the apparatus.

Fig. 2 is a sectional plan view.

Fig. 3 is a diagrammatic prospective view, showing the course of the fluid medium by the arrangement of the pipes.

Fig. 4 is an enlarged detail of the heat exchanger for preheating the incoming air.

Figure 5:
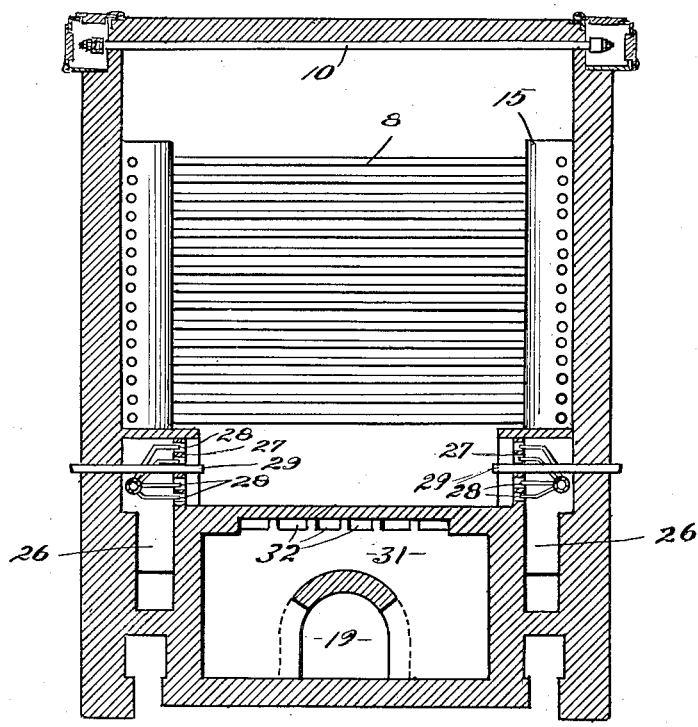
Fig. 5 is a view taken along the line 5—5 in Fig. 1.

Referring to the drawings, at 1 is shown a furnace consisting of a fire chamber 2 and a tube chamber 3—between the chambers 2 and 3 is a bridge wall 4 above which is a passage permitting the gases of combustion to pass from the fire chamber to the tube chamber.

Figure 6:
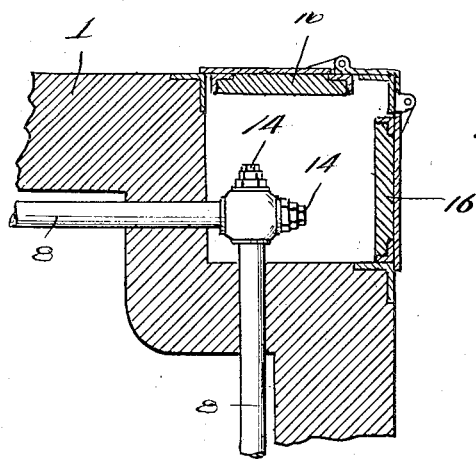
Fig. 6 is an enlarged detail of the corner fittings for the heating tubes in the fire chamber shown also in Fig. 1.

The arrangement of the tubes is as follows: In the lower part of the tube chamber is a bank of tubes, designated as 5, to which the medium to be heated, such as oil, is introduced through the inlet line designated as 6 in Fig. 3; the oil is circulated back and forth through the bank of tubes 5 and is passed thence through a transfer line 7 to the side wall tubes 8 arranged along the vertical surfaces of the fire chamber, shown in Figs. 1, 2 and 3. After being circulated through the side wall tubes 8 the liquid passes through the line 9 to the tubes 10 arranged against the upper reflecting surface or ceiling of the fire and tube chambers. From the ceiling tubes the liquid is directed through the line 11 to the final bank of tubes regarded as a superheating bank or set 12 positioned in the upper part of the tube chamber and on discharge from this bank to the line 13 the medium is discharged into any suitable receptacle or chamber, not shown, where it is to be further processed. The side wall tubes of the fire chamber are connected at the corners by right angled fittings 13 equipped with cleaning plugs 14. These corner fittings, shown in Fig. 2 and Fig. 6, are insulated from the excessive heat of the fire chamber by right angled enclosing walls 15, which project into the furnace enclosing and shielding the fittings from the heat. Excessive loss of heat by radiation is prevented by heavily insulated cleaning doors 16, shown in Fig. 6, which facilitate the removal of the cleaning plugs 14 and the cleaning of the tubes. The upper ceiling tubes are fitted with return bend connections equipped with cleaning plugs, not shown. Likewise the tube banks in the tube chamber 3 are equipped with similar return bend connections 17, shown in Fig. 2.

A vertical screened air inlet pipe 18, shown in Fig. 1, is located in connection with the flue 19, so that the incoming air is directed by a circuitous route produced by baffles 20 over the surface of a heating exchanger designated as 21 in Fig. 4, thus causing the incoming air to acquire heat from the hot flue gases passing to the chimney 22a through the flue 19.

After passing through the heat exchanger the preheated air is directed through a duct 22 to a fan 23 driven by a motor 24. This fan draws the air from the atmosphere through the heat exchanger 21 and discharges it through the ducts 25 to the blow boxes 26. These blow boxes communicate with the fire chamber by gratings 27, in which are positioned a plurality of gas jets 28 and an oil burner 29 in connection with each set of gas jets or burners. The furnace is preferably end fired, so that the flames from both ends impinge centrally of the fire chamber, causing a spreading of the combustion gases centrally of the chamber, which tends to create excessive convection heat in this portion of the fire chamber. To offset this tendency and to more or less protect the side wall tubes from the excessive heat created by the impingement or impact of the flames of combustion, a protective screen of gas, such as recycled flue gas, is introduced along the side walls through a plurality of elongated apertures, designated in Figs. 2 and 1, as 30. To supply a tempering medium, such as the flue gas, to these apertures for introduction to the fire chamber, a tunnel 31 is connected into the flue 19, which has secondary leads 32 terminating in the openings 30 in the bottom of the fire chamber.

The passage of the gases of combustion generated by the burning of a combustible fuel in the fire chamber is over the bridge wall and thence downwardly through the tube chamber over the tube banks 12 and 5, and out through the breachings 33, which are connected to the suction side of the fans 34 driven from any convenient source of power through the belt 35. On discharge from the fans the flue gases pass through a Y pipe 36, which is connected to the flue 19; the latter having interposed therein the heat exchanger 20 between the fans 34 and the chimney 22a. A manhole 37, shown in Figs. 1 and 2, is used for cleaning the flue and the flue gas passageways of the heat exchanger.

The arrangement of the tubes along the side walls of the fire chamber and in close proximity thereto, not only eliminates materially the amount of direct radiant heat to which the reflecting surfaces are subjected and which have a decided deteriorating effect to the brick work, but also permits of a much more rapid heat exchange between the source of heat and the medium flowing through these tubes. In a furnace where the heat exchange is effected by positioning tubes centrally in a chamber and passing the gases of combustion or heating gases over the tubes, a considerable part of the heat absorbed by the tubes is reflected heat from the walls of the chamber, and where high temperatures are an advantage, as in the oil industry, objectionable deterioration is an ever present factor.

When the tubes are placed upon the reflecting surfaces of the fire chamber at least fifty (50%) percent or more of the side walls and the upper reflecting surface are covered by the surfaces of the tubes and receive the direct radiant heat of the flame. This heat, though intense, is rapidly dissipated by the fluid medium coursing rapidly through the tubes. This arrangement of the tubes affords a means of maintaining higher flame temperatures than have heretofore been usual in furnace construction, permitting more complete and efficient combustion and raising the carbon dioxide content of the flue gases.

In the flue 19 at a point designated at 38 in Fig. 2 is a carbon dioxide meter which ascertains the percentage of carbon dioxide by a resistance mechanism in the flue gases. This meter is connected by an electrical control shown diagrammatically at 39 to the switch box 40, controlling the power supplied to the motor 24 through the lines 41. When the percentage of carbon dioxide shows a decrease in the flue gases, indicating that an excess of air is being supplied, the speed of the motor 24 and fan 23 is reduced automatically by the carbon dioxide meter 38 through the switch 40, so that there is at all times maintained a constant relation between the percentage of carbon dioxide in the flue gases and the amount of air supplied to the fire chamber by the fan 23.

Although for illustrative purposes the invention has been shown and described in connection with apparatus of more or less specific details of construction, arrangement and location of parts and as embodying in its mode of operation a certain series and sequence of somewhat definite steps and operating conditions, it will be understood that many of the objects and advantages of the invention may be obtained by the employment of apparatuses of modified character without departing from the spirit and scope of the invention.

I claim as my invention:

1. A heater comprising radiant heat and convection heat chambers, a bank of preheating tubes disposed in the cooler portion of the convection heat chamber, connection from this bank of tubes to a coil disposed about the side walls of the radiant heat chamber, a bank of superheating tubes disposed in the hotter portion of said convection heat chamber and a group of exposed tubes positioned on the roof of the radiant and convection heat chambers connecting the superheater with the coil in said radiant heat chamber, and means for recycling a portion of the flue gases in said radiant heat chamber between the wall tubes and the source of radiant heat.

2. A heater, comprising fire and tube chambers, separated by a bridge wall, three serially connected tube sections, consisting of preheater, radiant and superheater sections, the tubes of the radiant section positioned upon the reflecting surfaces of the fire chamber, the preheater and superheater sections receiving the convection heat of the combustion gases in the tube chamber, said tube sections arranged so that heat is transmitted successively to the radiant tubes, the superheater tubes and finally the preheater tubes, means for withdrawing a portion of the flue gases and recycling the same to the fire chamber in the form of a protective screen between the wall tubes and the source of radiant energy.

3. A heater, comprising fire and tube chambers, separated by a bridge wall, three serially connected tube sections, consisting of preheater, radiant and superheater sections, the tubes of the radiant section positioned upon the reflecting surfaces of the fire chamber, the preheater and superheater sections receiving the convection heat of the combustion gases in the tube chamber, said tube sections arranged so that heat is transmitted successively to the radiant tubes, the superheater tubes and finally the preheater tubes, a conduit for conveying the flue gases to the fire chamber, and means associated with the bottom of the fire chamber for distributing the flue gases upwardly in the fire chamber in the form of a screen between the source of radiant energy and the wall tubes.

4. A heater, comprising fire and tube chambers, separated by an intermediate bridge wall, uncovered tubes disposed upon the roof and perpendicular surfaces of the fire chamber, comprising an intermediate or radiant tube section, said tubes receiving substantially only radiant heat, banks of tubes in the tube chamber receiving substantially only convection heat and consisting of a preheating section and a superheating section, connections for effecting continuous travel of a medium passing through the tubes in the tube and fire chambers, the sections of tubes being so arranged that the gases of combustion pass successively over the radiant section, the superheater section and finally over the preheating section, the tubes disposed upon the perpendicular surfaces of the fire chamber being serially connected by corner fittings, the walls of said fire chamber having cutaway corners through which said tubes extend, the fittings on said tubes being disposed exteriorly of the fire chamber.

5. A heater, comprising fire and tube chambers, separated by an intermediate bridge wall, uncovered tubes disposed upon the roof and perpendicular surfaces of the fire chamber, comprising an intermediate or radiant tube section, said tubes receiving substantially only radiant heat, banks of tubes in the tube chamber receiving substantially only convection heat and consisting of a preheating section and a superheating section, connections for effecting continuous travel of a medium passing through the tubes in the tube and fire chambers, the sections of tubes being so arranged that the gases of combustion pass successively over the radiant section, the superheater section and finally over the preheating sections, means for withdrawing a portion of the flue gases and recycling the same to the fire chamber in the form of a protective screen between the wall tubes and the source of radiant energy.

6. A heater, comprising fire and tube chambers, separated by an intermediate bridge wall, uncovered tubes disposed upon the roof and perpendicular surfaces of the fire chamber, comprising an intermediate or radiant tube section, said tubes receiving substantially only radiant heat, banks of tubes in the tube chamber receiving substantially only convection heat and consisting of a preheating section and a superheating section, connections for effecting continuous travel of a medium passing through the tubes in the tube and fire chambers, the sections of tubes being so arranged that the gases of combustion pass successively over the radiant section, the superheater section and finally over the preheating section, a conduit for conveying the flue gases to the fire chamber and means associated with the bottom of the fire chamber for distributing the flue gases upwardly in the fire chamber in the form of a screen between the source of radiant energy and the wall tubes.

7. A heater, comprising fire and tube chambers, separated by a bridge wall, three serially connected tube sections, consisting of preheater, radiant and superheater sections, the tubes of the radiant section positioned upon the reflecting surfaces of the fire chamber, the preheater and superheater sections receiving the convection heat of the combustion gases in the tube chamber, said tube sections arranged so that heat is transmitted successively to the radiant tubes, the superheater tubes and finally the preheater tubes, a subterranean flue tunnel connected with the tube chamber for withdrawing flue gases from the flue chamber, means in said fire chamber for directing a stream of gases upwardly therein between the flames therein and the tubes on the side walls and means for conveying gases from said subterranean flue tunnel to said gas distributing means.

8. In a pipe still; a housing having therein a combustion chamber with vertical walls having square corners with reentrant angles; a bank of oil tubes in said combustion chamber adjacent the side walls thereof, the ends of said tubes projecting through the walls of the combustion chamber at such reentrant angles; and connections between the ends of said tubes lying outside of the walls of the combustion chamber.

9. In a pipe still; a housing having therein a combustion chamber with vertical walls having square corners with reentrant angles; and a bank of oil tubes in said combustion chamber adjacent the side walls thereof, said tubes forming a continuous helical coil, the connections for said tubes lying at the corners outside of said reentrant angles.

10. A heater comprising radiant heat and convection heat chambers, a bank of preheating tubes disposed in the cooler portion of the convection heat chamber, connections from this bank of tubes to a coil disposed about the side walls of the radiant heat chamber, a bank of tubes disposed in the hotter portion of said convection heat chamber and a group of exposed tubes positioned on the roof of the radiant and convection heat chambers connecting the tubes disposed in the hotter portion of the convection heat chamber with the coil in said radiant heat chamber and means for recycling a portion of the flue gases in said radiant heat chamber between the wall tubes and the source of radiant heat.

11. A heater comprising radiant heat and convection heat chambers, a bank of preheating tubes disposed in the cooler portion of the convection heat chamber, connections from this bank of tubes to a coil disposed about the side walls of the radiant heat chamber, a bank of tubes disposed in the hotter portion of said convection heat chamber and a group of exposed tubes positioned on the roof of the radiant and convection heat chambers connecting the tubes disposed in the hotter portion of the convection heat chamber with the coil in said radiant heat chamber, means for recycling a portion of the flue gases in said radiant heat chamber between the wall tubes and the source of radiant heat and means for preheating air to be supplied to the source of radiant heat by another portion of the flue gases.

WALTER M. CROSS.